(12) United States Patent
Kaneko et al.

(10) Patent No.: US 7,602,138 B2
(45) Date of Patent: Oct. 13, 2009

(54) DRIVING APPARATUS AND DRIVING SYSTEM FOR ELECTRIC MOTOR

(75) Inventors: Daigo Kaneko, Hitachi (JP); Takahiro Suzuki, Tokai (JP); Tsunehiro Endo, Hitachiota (JP); Kazuaki Tobari, Hitachiota (JP); Hajime Uematsu, Narashino (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 11/527,475

(22) Filed: Sep. 27, 2006

(65) Prior Publication Data
US 2007/0159130 A1 Jul. 12, 2007

(30) Foreign Application Priority Data
Jan. 11, 2006 (JP) .............................. 2006-003570

(51) Int. Cl.
H02P 21/00 (2006.01)
(52) U.S. Cl. ........................ 318/806; 318/767; 318/798; 318/700; 318/400.01
(58) Field of Classification Search ................. 318/806, 318/767, 798, 400.01, 700
See application file for complete search history.

(56) References Cited

U.S. PATENT DOCUMENTS

| | | | | |
|---|---|---|---|---|
| 5,923,728 A * | 7/1999 | Ikkai et al. | | 318/807 |
| 5,936,378 A * | 8/1999 | Iijima et al. | | 318/807 |
| 6,018,694 A * | 1/2000 | Egami et al. | | 701/102 |
| 6,400,107 B1 * | 6/2002 | Nakatani et al. | | 318/400.21 |
| 6,628,099 B2 * | 9/2003 | Iwaji et al. | | 318/700 |
| 6,696,812 B2 * | 2/2004 | Kaneko et al. | | 318/700 |
| 6,727,669 B2 * | 4/2004 | Suzuki et al. | | 318/139 |
| 6,803,736 B1 * | 10/2004 | Hommel et al. | | 318/567 |
| 6,822,417 B2 * | 11/2004 | Kawaji et al. | | 318/701 |
| 7,075,259 B2 * | 7/2006 | Nakai et al. | | 318/432 |
| 7,170,243 B2 * | 1/2007 | Nakagawa et al. | | 318/400.09 |
| 7,235,937 B2 * | 6/2007 | Takai et al. | | 318/139 |
| 2002/0153857 A1 * | 10/2002 | Iwaji et al. | | 318/700 |
| 2003/0030404 A1 | 2/2003 | Iwaji et al. | | |
| 2003/0052640 A1 * | 3/2003 | Iwaji et al. | | 318/700 |
| 2003/0057912 A1 * | 3/2003 | Iwaji et al. | | 318/700 |
| 2005/0063117 A1 * | 3/2005 | Amano et al. | | 361/90 |

FOREIGN PATENT DOCUMENTS

| | | |
|---|---|---|
| EP | 1 263 125 A2 | 12/2002 |
| JP | 07-245981 | 9/1995 |
| JP | 2001-251889 | 9/2001 |
| JP | 2002-233199 A | 8/2002 |
| JP | 2004-222382 A | 8/2004 |

* cited by examiner

Primary Examiner—Rita Leykin
(74) Attorney, Agent, or Firm—Antonelli, Terry, Stout & Kraus, LLP.

(57) ABSTRACT

An apparatus for controlling the drive of an electric motor, having a current detector for detecting the current through an externally connected electric motor; a controller for generating a control signal to control the electric motor on the basis of the current detected by the current detector and the speed command for specifying the rotational speed of the electric motor; wherein the apparatus includes a load estimator for estimating the mechanical load condition associated with the electric motor on the basis of the current detected by the current detector and the speed command, and the controller controls the electric motor current on the basis of the detected current, the speed command and the estimated load condition.

5 Claims, 13 Drawing Sheets

US 7,602,138 B2

DRIVING APPARATUS AND DRIVING SYSTEM FOR ELECTRIC MOTOR

BACKGROUND OF THE INVENTION

This invention relates to an apparatus and a system for controlling the drive of an electric motor by detecting the motor current.

In controlling the rotational speed of a poly-phase alternating current motor with a poly-phase rectangular voltage, the detection of the angular position of the rotor is required.

Conventionally, a method has been disclosed which controls a synchronous motor without directly detecting the electric angular position of the rotor in the electric motor by means of a sensor, but which estimates the positions of the magnetic poles of the synchronous motor. For example, JP-A-7-245981 discloses a method wherein a voltage pulse is applied to a permanent magnet synchronous motor (hereafter referred to as PM motor) so that the positions of the magnetic poles are estimated on the basis of a current pulse developed along the axis perpendicular to the axis along which the voltage pulse was applied. This method is applicable to starting a PM motor which is first at rest. JP-2001-251889 discloses a method of estimating on the basis of the current flowing through a PM motor the phase of a voltage induced due to the rotation of the PM motor.

SUMMARY OF THE INVENTION

However, the method disclosed in JP-A-7-245981 can be applied only to the PM motor having a salient pole configuration. It also has a problem that the application of a pulsating voltage to the electric motor generates acoustic noise. Thus, the method is limited in its application. Moreover, according to JP-A-2001-251889, the phase of the voltage induced due to the rotation of the PM motor is estimated on the basis of the current flowing through a PM motor, and the axial displacement between the control axis and the effective axis is minimized to control the electric motor. This method is independent of the physical configuration of the PM motor to which it is applied, and also free from a problem of noise. However, as the induced voltage is proportional to the rotational speed, the method is still not applicable to the PM motor when it is running at a low speed.

It is therefore an object of this invention to provide an apparatus and a system for controlling an electric motor with high efficiency even when it is running at a low speed.

In order to solve the above mentioned problems, this invention provides an apparatus for controlling the drive of an electric motor, comprising a current detector for detecting the current through an externally connected electric motor; a controller for generating a control signal to control the electric motor on the basis of both the current detected by the current detector and the speed command for specifying the rotational speed of the electric motor; and a load estimator for estimating the mechanical load condition associated with the electric motor on the basis of both the current detected by the current detector and the speed command, wherein the controller controls the electric motor current on the basis of the detected current, the speed command and the estimated load condition.

According to this apparatus, the electric motor current is controlled on the basis of the detected motor current, the speed command and the estimated mechanical load condition. As the detected value, the speed command and the estimated load condition are all independent of the rotational speed of the electric motor, the electric motor can be stably controlled even when it is running at a low speed.

Thus, according to this invention, there is provided an apparatus and a system for stably controlling the drive of an electric motor even when it is running at a slow speed.

Other objects, features and advantages of the invention will become apparent from the following description of the embodiments of the invention taken in conjunction with the accompanying drawings.

DESCRIPTION OF THE EMBODIMENTS

Embodiment 1

Figure 1:
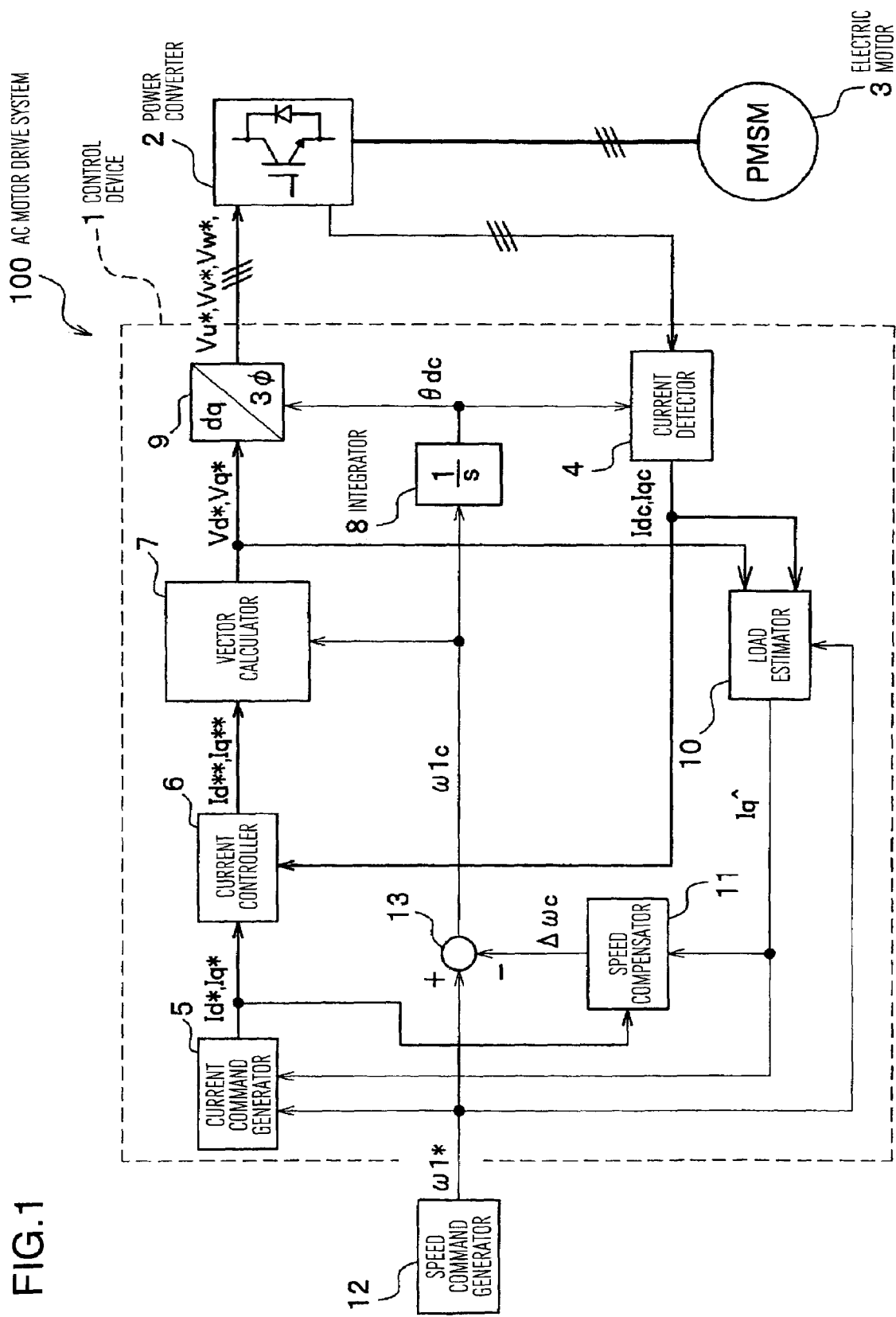
FIG. 1 schematically shows the overall constitution of an AC motor driving system as an embodiment of this invention.

FIG. 1 schematically shows the overall constitution of a motor driving system (an AC motor driving system) as a first embodiment of this invention. The AC motor driving system 100 comprises an electric motor 3, a control device 1 for controlling the drive of the electric motor 3 and a power converter 2 for driving the electric motor 3. The estimation of the angular position of the rotor in the electric motor 3 and the control of the rotational speed of the rotor are performed within the control device 1. In this specification, the electric motor 3 is assumed to be a three-phase synchronous motor having a permanent magnet rotor (hereafter referred to as PMSM if necessary). In FIG. 1, three-phase signal lines are denoted by three parallel, short slant line segments crossing the signal lines. The control device 1 performs a vector control in the dc-qc coordinate plane having its dc- and qc-axes, the dc-axis running along the direction of the exciting current (axis of the magnetic flux) and the qc-axis running along the direction of the torque current. The functions of the respective constituents of the control device 1 are realized by the program executed by hardware such as central processing units (CPUs) and memories, or a computer.

Figure 2:
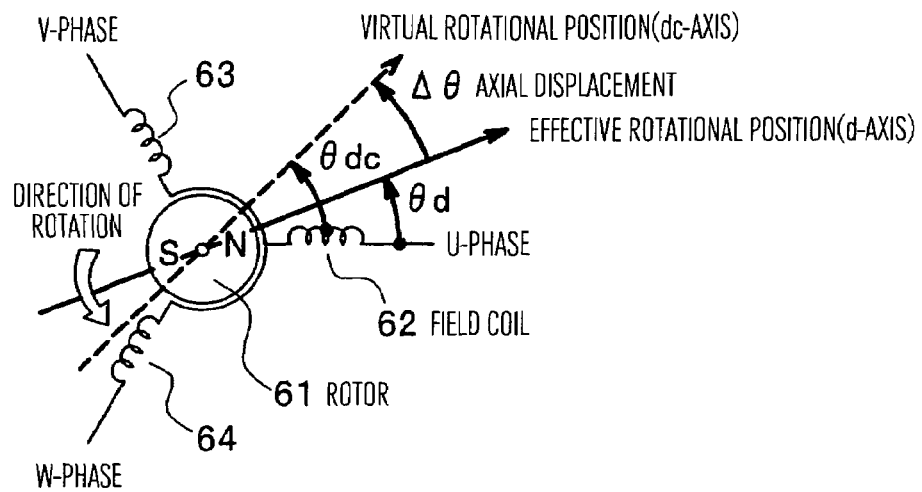
FIG. 2 is a diagram for explaining the effective and the virtual angular positions of the rotor of the electric motor used with the system shown in FIG. 1.

The rotational coordinate system, i.e. dc-qc plane, is now explained with reference to FIG. 2. The field windings consists of the U-phase, V-phase and W-phase field coils 62, 63 and 64 in Y-connection. The electric motor 3 is so constructed that the rotor 61 having plural (two) magnetic poles rotates in the stator having the U-, V- and W-phase field coils 62, 63 and 64. Here, it is defined that the axis passing through the N and S magnetic poles of the rotor 61 be the effective axis, i.e. d-axis, that the rotary axis representing the virtual angular position, controlled within the control device 1, of the rotor 61 be the dc-axis, and that the axial displacement between the d-axis and the dc-axis be given by $\Delta\theta$. Then, the angle $\theta_{dc}$ between the dc-axis, used as the virtual control axis, and the axis of the U-phase field coil 62 is given by the following formula:

$$\theta_{dc}=\theta_d+\Delta\theta,$$

where the d-axis and the axis of the U-phase field coil 62 make an angle $\theta_d$. It is also assumed that an axis rotated counterclockwise through 90 degrees with respect to the d-axis is termed the q-axis and that an axis rotated counterclockwise by 90 degrees with respect to the dc-axis is named the qc-axis, the direction of rotation of the rotor 61 being counterclockwise.

With reference to FIG. 1 again, the control device 1 comprises a current detector 4 for detecting current flowing from a power converter 2 to the electric motor 3; a current command generator 5 for generating a target current flowing through the electric motor 3; a current controller 6 for operating in such a manner that the current having passed actually through the electric motor is made a new target current on the basis of the target current and the currents detected by the current detector 4; a vector calculator 7 for calculating a voltage to be applied to the electric motor 3 on the basis of a required speed command or a required command torque; an integrator 8 for integrating an electric angular speed $\omega 1c$ representative of the electric angular speed of the electric motor 3 estimated within the control device 1 and for calculating the electric angular position (or phase) $\theta_{dc}$ of the rotor of the electric motor 3; a d-q reverse transformer 9 for transforming the command voltages $V_d^*$ and $V_q^*$ along the dc- and qc-axes into the three-phase AC command voltages $V_U^*$, $V_V^*$ and $V_W^*$; a load estimator 10 for estimating the load condition of the electric motor 3 on the basis of the current detected by the current detector 4; a speed compensator 11 for generating a compensatory speed command $\Delta_{\omega c}$ on the basis of the output of the load estimator 10; a speed command generator 12 for generating the speed command $\omega 1^*$ for the electric motor 3; and an adder 13 for adding the compensatory speed command $\Delta_{\omega c}$ to the speed command $\omega 1^*$ so as to obtain the electric angular speed $\omega 1c$ to be estimated within the control device 1. Here, the quantities with asterisk (*) attached as superscript are the command quantities.

Description will now be made of the operating principle of this embodiment. The control device 1 operates as follows. The current detector 4 detects the current flowing into the electric motor 3 to generate the detected current values $I_{dc}$ and $I_{qc}$ transformed into the dc- and qc-axes components. The current command generator 5 generates the current commands $I_d^*$ and $I_q^*$ along the dc- and qc-axes serving as target currents required to obtain a required speed or torque. The current controller 6 generates the second current commands $I_d^{}$ and $I_q^{}$ on the basis of the current commands $I_d^*$ and $I_q^*$ and the detected currents $I_{dc}$ and $I_{qc}$. The vector calculator 7 delivers the command voltages $V_d^*$ and $V_q^*$ along the dc- and qc-axes which are to be applied to the electric motor 3 in such a manner that the detected currents $I_{dc}$ and $I_{qc}$ may be made equal to the current commands $I_d^*$ and $I_q^*$ depending on the second current commands $I_d^{}$ and $I_q^{}$, respectively. The d-q reverse transformer 9 calculates from the command voltages $V_d^*$ and $V_q^*$ the three-phase AC command voltages $V_U^*$, $V_V^*$ and $V_W^*$, which are delivered to the power converter 2. The power converter 2 applies the voltages corresponding to the command voltages $V_d^*$ and $V_q^*$ to the electric motor 3 on the basis of three-phase AC command voltages $V_U^*$, $V_V^*$ and $V_W^*$.

When the electric angular position $\theta_{dc}$ of the rotor of the electric motor 3 is directly detected by using a magnetic pole position detector, the magnetic pole position detector, depending on its position of detection, derives the d-axis current $I_d$ as the exciting current component and the q-axis current $I_q$ as the torque current component, from the detected current. The vector calculator 7 controls these two current components separately and changes the values of the voltage commands $V_d^*$ and $V_q^*$ along the dc- and qc-axes in such a manner that the current commands $I_d^*$ and $I_q^*$ are made equal to the detected currents $I_{dc}$ and $I_{qc}$, respectively. Accordingly, for the vector control to be performed according to the conventional method, it is necessary to detect the positions of the magnetic poles of the rotor in the electric motor. According to the electric motor drive system as the first embodiment of this invention as described above, however, the vector control can be easily carried out without using any magnetic pole position detector.

Figure 3:
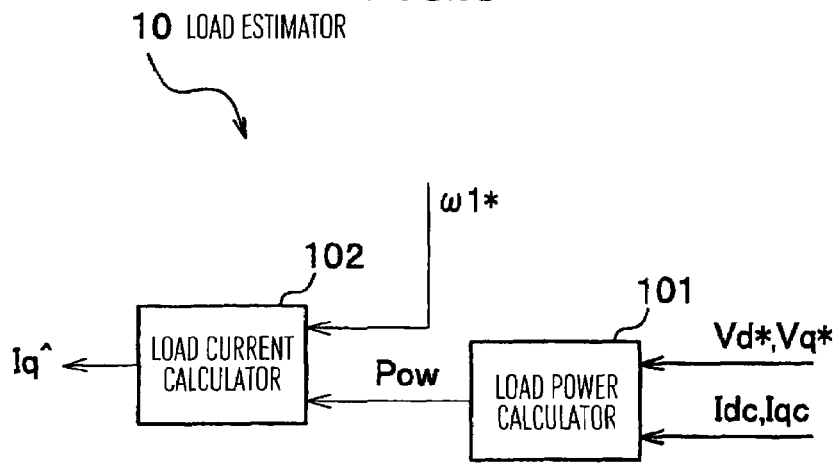
FIG. 3 schematically shows the constitution of the load estimator used in the control device of the system shown in FIG. 1.

Description will now be made of the operations of the load estimator 10 serving as a feature of this embodiment and the control device 1 using the load estimator 10. First, the detailed constitution of the load estimator 10 is shown in FIG. 3. The load estimator 10 consists of a load power calculator 101 for calculating the load power $P_{ow}$ on the basis of the voltage commands $V_d^*$ and $V_q^*$ and the detected currents $I_{dc}$ and $I_{qc}$ and a load current calculator 102 for obtaining the estimated torque current $I_q\hat{}$ to flow through the electric motor 3 on the basis of the load power $P_{ow}$ and the speed command $\omega 1^*$. Here, the quantity with a circumflex (^) attached as a superscript indicates an estimated quantity. The load power $P_{ow}$ is calculated in the load power calculator 101 by using the following formula (1) while the estimated torque current $I_q\hat{}$ is obtained in the load current calculator 102 by using the following formula (2). It is to be noted here that these quantities are independent of the rotational speed of the electric motor 3.

$$P_{ow}=1.5\times\{(V_d^*\times I_{dc}+V_q^*\times I_{qc})-R1\times(I_{dc}^2+I_{qc}^2)\} \quad (1)$$

$$I_q\hat{}=P_{ow}/(\omega 1^*\times Ke), \quad (2)$$

where R1 gives the winding resistance of the electric motor 3, and Ke indicates the constant associated with the induced voltage corresponding to the magnetic flux. The formula (1) gives the effective power supplied to the electric motor 3 minus the power loss across the winding resistance. The formula (1) is characterized in that it can complete its calculation without using the data relating to the positions of the magnetic poles as both the voltage commands $V_d^*$ and $V_q^*$ and the detected currents $I_{dc}$ and $I_{qc}$ are the quantities represented along the dc- and qc-axes. The formula (2) teaches that the product of torque and speed equals the power. The load estimator 10 calculates the estimated torque current $I_q\hat{}$ by using the formula (2) as the effective electric angular speed ω1M equals the speed command ω1* under the normal condition. It should be noted here that if the effect of salient poles is taken into consideration, the following formula (3) should be used to calculate the estimated torque current $I_q\hat{}$.

$$I_q\hat{} = P_{ow}/[\omega 1^* \times \{Ke + (Ld-Lq) \times I_d^*\}], \quad (3)$$

where Ld indicates the inductance of the winding along the d-axis representing the magnetic flux axis of the electric motor 3, and Lq gives the inductance of the winding along the q-axis representing the torque axis of the electric motor 3.

Figure 4:
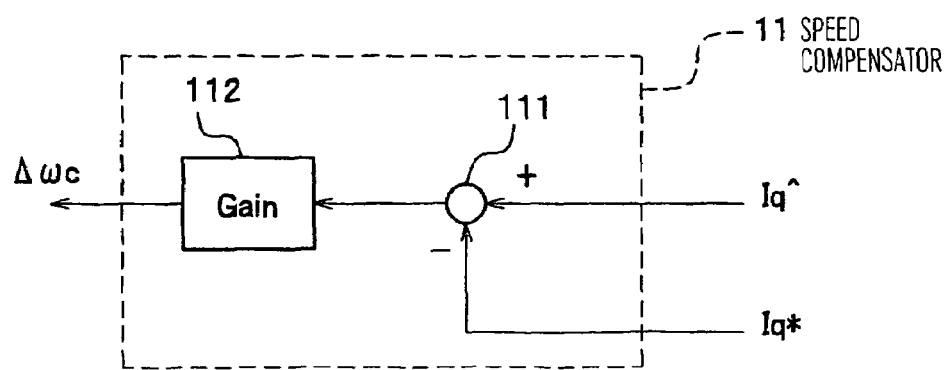
FIG. 4 schematically shows the constitution of the speed compensator used in the control device of the system shown in FIG. 1.

FIG. 4 schematically shows the constitution of the speed compensator 11. In the speed compensator 11, a second adder 111 subtracts the torque current command $I_q^*$ from the estimated torque current $I_q\hat{}$ to extract the oscillating component of the estimated current $I_q\hat{}$, and a gain compensator 112 multiplies the oscillating component by a preset gain to produce the compensatory speed command $\Delta_{\omega c}$.

Figure 5:
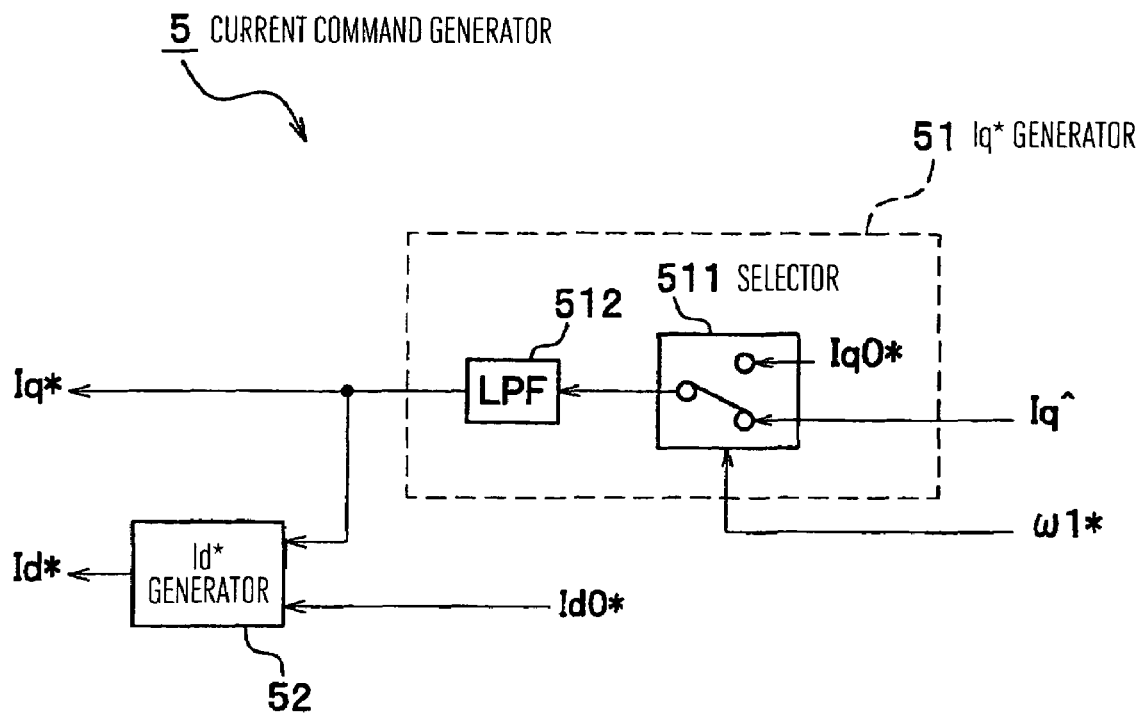
FIG. 5 schematically shows the constitution of the current command generator used in the control device of the system shown in FIG. 1.

Description will now be made of the operation of the control device 1 using the estimated current $I_q\hat{}$. FIG. 5 schematically shows the constitution of the current command generator 5 comprising an $I_q^*$ generator 51 for generating current command $I_q^*$ and an $I_d^*$ generator 52 for generating the current command $I_d^*$. The $I_q^*$ generator 51 consists of a selector 511 and a low-pass filter 512. The $I_q^*$ generator 51 holds therein the initial value $I_q 0^*$ of the current command $I_q^*$ while the $I_d^*$ generator 52 holds therein the initial value $I_d 0^*$ of the current command $I_d^*$.

Figure 6:
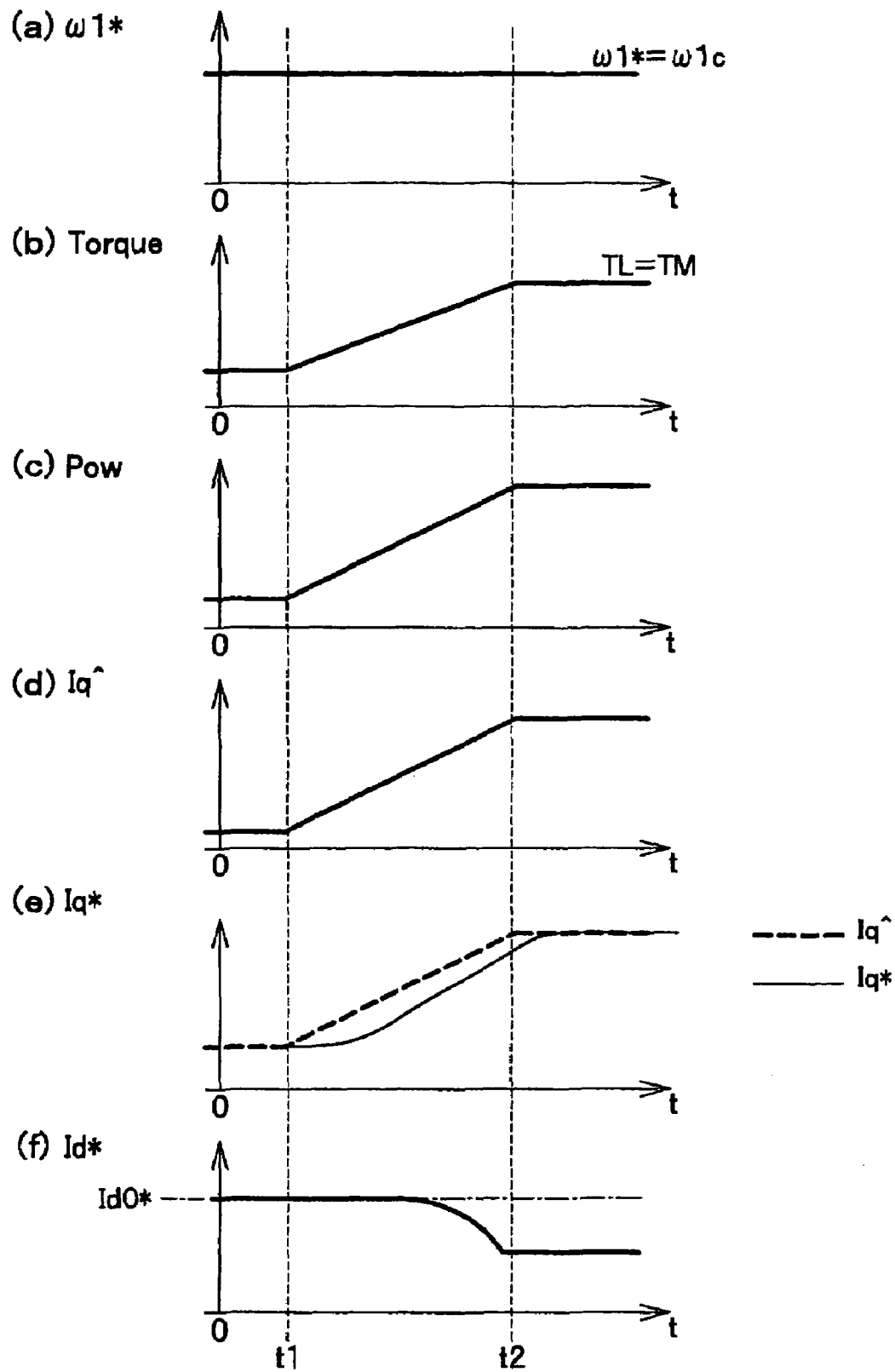
FIG. 6 shows several graphs used for explaining an operation of the control device of the system shown in FIG. 1.

In FIG. 6, (a) through (f) graphically show the operations of the current command generator 5 and the load estimator 10 when the load torque of the electric motor 3 linearly increases with the speed command ω1* kept constant. In FIG. 6, (a) shows the speed command ω1* which is kept constant. The load torque TL as shown in (b) of FIG. 6 increases linearly from the time instant t1 to the time instant t2. The torque TM generated by the electric motor 3 is assumed to be equal to the load torque TL. Under this assumption, the load power $P_{ow}$ as shown in (c) of FIG. 6 varies in proportion to the load torque TL. Accordingly, the estimated current $I_q\hat{}$, which is obtained by the load estimator 10, also varies in proportion to the load torque TL as shown in (d) of FIG. 6. Here, the selector 511 in the current command generator 5 continuously delivers the estimated current $I_q\hat{}$ so that, as shown in (e) of FIG. 6, the current commands $I_q^*$ becomes equal to the value which is obtained by filtering the estimated current $I_q\hat{}$ with the low-pass filter 512. The current command $I_d^*$ delivered from the $I_d^*$ generator 52, as shown in (f) of FIG. 6, gradually decreases starting at its initial value $I_d 0^*$ as the current command $I_q^*$ increases.

Figure 7:
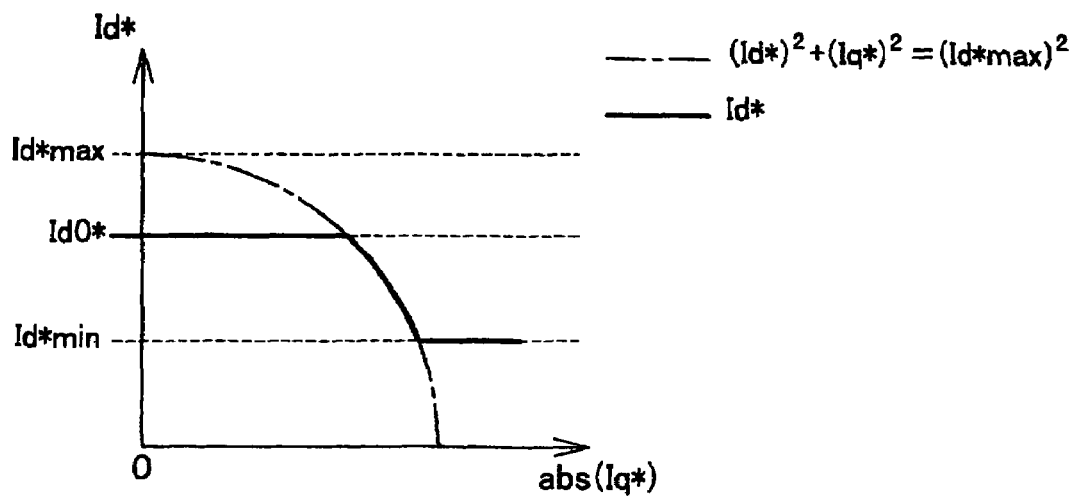
FIG. 7 shows a graph used for explaining the operation of the current command generator incorporated in the control device of the system shown in FIG. 1.

As shown in FIG. 7, the $I_d^*$ generator 52 determines the current command $I_d^*$ on the basis of the absolute value abs $(I_q^*)$ of the current command $I_q^*$. Here, $I_d^*_{max}$ is the maximum value at which the current command $I_d^*$ can be set, and $I_d^*_{min}$ is the minimum value at which the current command $I_d^*$ can be set. The value of $I_d^*_{max}$ must be smaller than the value of the maximum current that the power converter 2 can generate. On the other hand, in order that the load torque TL may increase up to the its rated value, the value of $I_d^*_{max}$ can be set between the values corresponding respectively to the 100% and 150%, of the rated current of the electric motor 3. The value of $I_d^*_{min}$ may ideally be equal to zero, but in such a case the motor synchronization will be easily lost when the load torque TL increases steeply from at a nearly zero value. Therefore, in order to prevent such synchronization loss, the value of $I_d^*_{min}$ should preferably be set between the values corresponding respectively to the 50% and 100%, of the rated current of the electric motor 3. And the current command $I_d^*$ can be determined by using the following formulas (4-1) through (4-3).

$$Id^* = Id0^* \text{ (if } \sqrt{(Id^*\max)^2 - (Iq^*)^2} < Id0^*) \quad (4\text{-}1)$$

$$Id^* = \sqrt{(Id^*\max)^2 - (Iq^*)^2} \text{ (if } Id^*\min < \sqrt{(Id^*\max)^2 - (Iq^*)^2} \leq Id^*\max) \quad (4\text{-}2)$$

$$Id^* = Id^*\min \text{ (if } \sqrt{(Id^*\max)2 - (Iq^*2)} \leq Id^*\min) \quad (4\text{-}3)$$

By determining the current command $I_d^*$ in this way, the magnitude of the current along the q-axis can be varied depending on the value of the load torque so that it becomes possible to drive the electric motor 3 in such a manner that the motor loss may be decreased when the load is small. Moreover, under the condition that $I_d 0^* = I_d^*_{max}$ and $I_d^*_{min} = 0$, it is also possible to drive the electric motor 3 in such a manner that only the phase of the motor current along the d-axis is varied. In such a case, as the magnitude of the current command remains the same, the synchronization loss seldom occurs even when the load torque TL increases steeply from at a nearly zero value.

Figure 8:
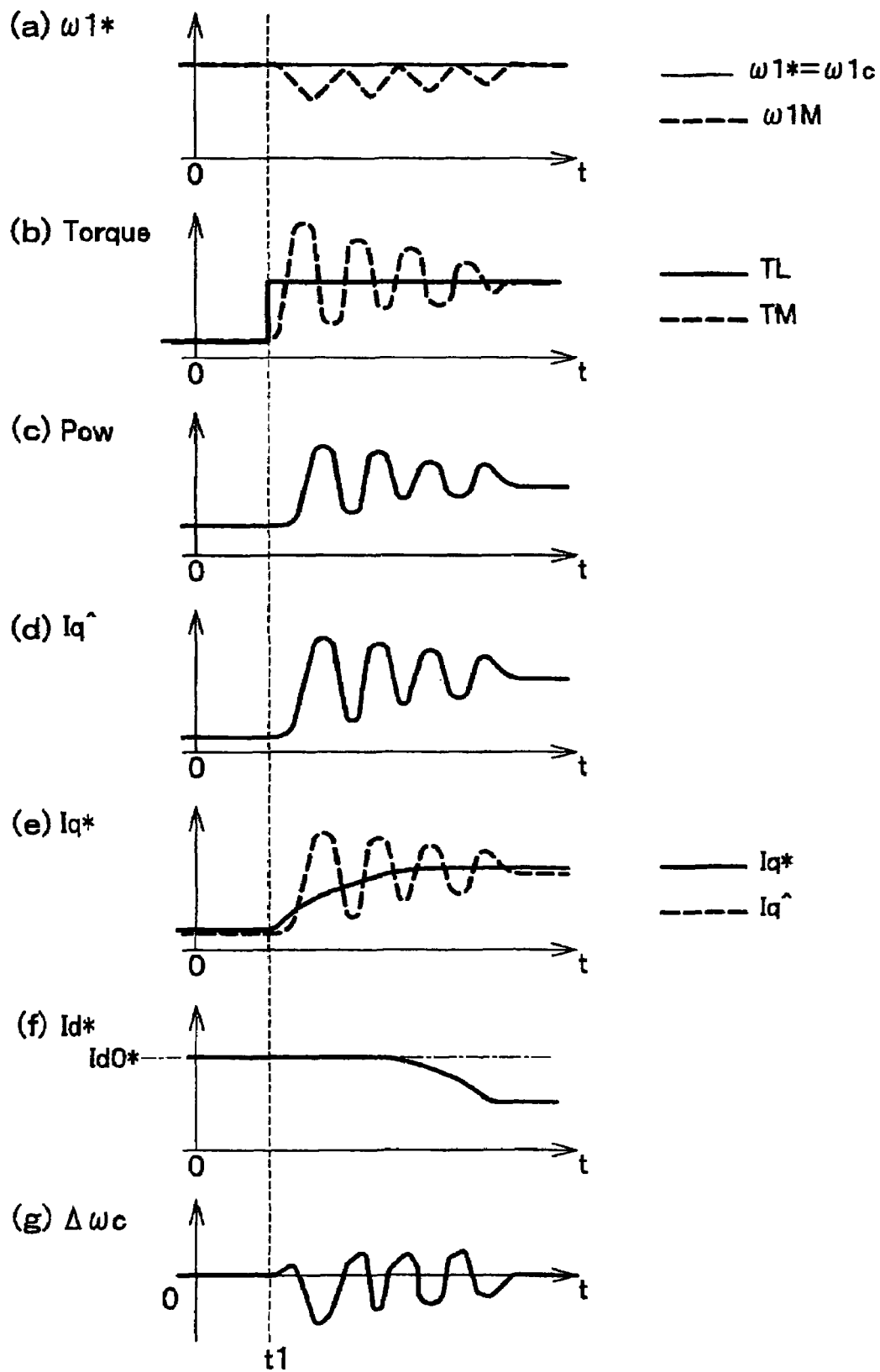
FIG. 8 shows several graphs used for explaining another operation of the control device of the system shown in FIG. 1.

Now, the operation of the speed compensator 11 will be described. In FIG. 8, (a) through (g) graphically show the changes in the speed command ω1* and the load torque TL when the load torque TL changes stepwise with the speed command ω1* kept constant; and the operations of the current command generator 5, the load estimator 10 and the speed compensator 11. In response to the stepwise change in the load torque TL, the effective electric angular speed ω1M and the generated torque TM, of the electric motor 3 oscillate as shown in (a) and (b) of FIG. 8. If the oscillation of the effective electric angular speed ω1M is large, the synchronization loss occurs, and the electric motor 3 can be driven no longer.

Figure 9:
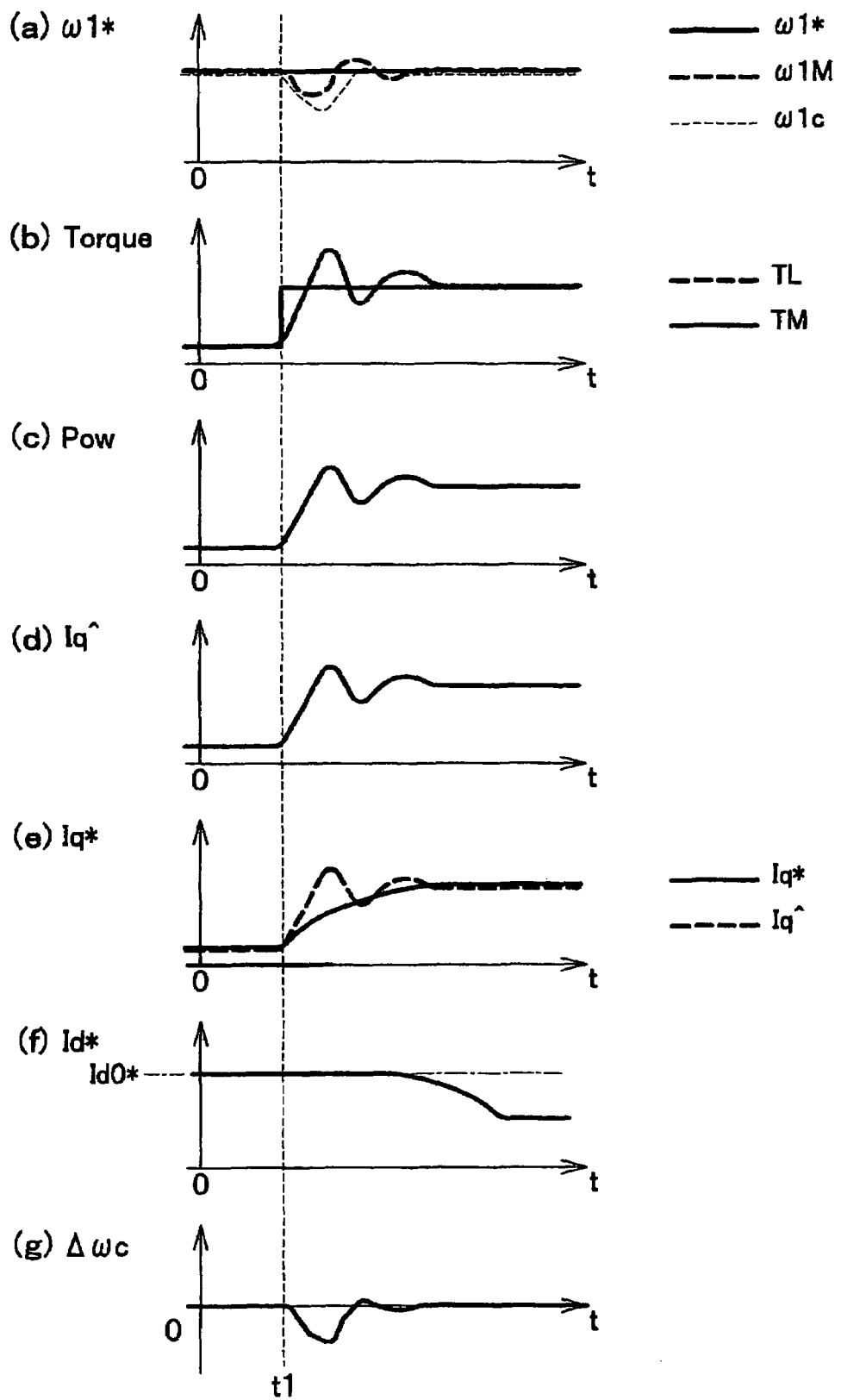
FIG. 9 shows several graphs used for explaining yet another operation of the control device of the system shown in FIG. 1.

The estimated electric angular speed ω1c within the control device 1 can be obtained by subtracting in the adder 13 the compensatory speed command $\Delta_{\omega c}$ generated by speed compensator 11 from the speed command ω1*. As a result, by using the speed compensator 11, the operation of the control device 1, when the load torque TL changes stepwise, is as shown in (a) to (g) of FIG. 9. Namely, the oscillation of the effective electric angular speed ω1M of the electric motor 3 can be suppressed even when the load torque TL changes stepwise so that the electric motor 3 can be stably driven.

Figure 10:
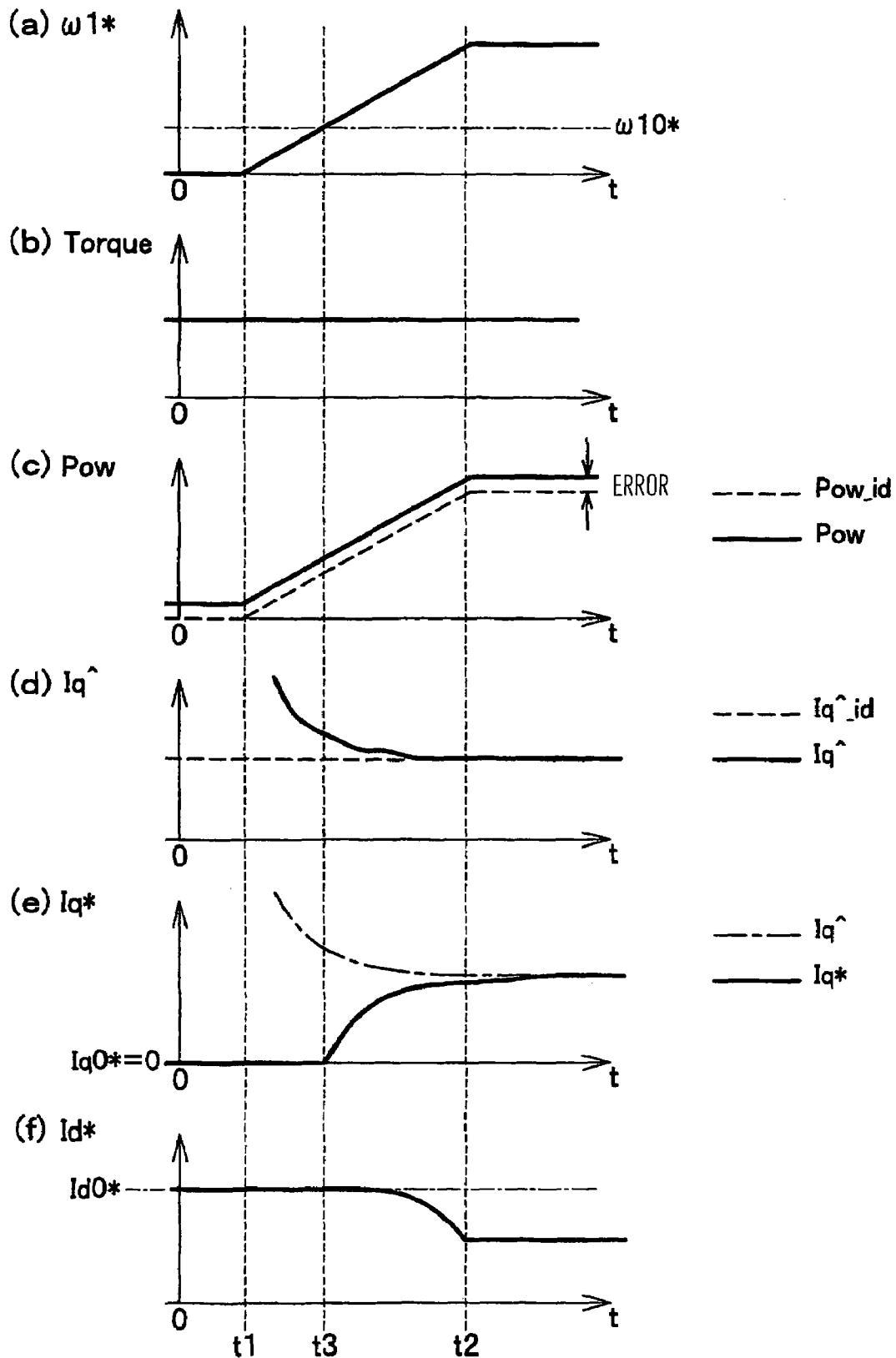
FIG. 10 shows several graphs used for explaining still another operation of the control device of the system shown in FIG. 1.

Description will now be made of the case where the electric motor 3 is started when it is initially at rest. In FIG. 10, (a) through (f) graphically show the operations of the current command generator 5 and the load estimator 10. In FIG. 10, (a) shows the change with time of the speed command ω1* for the electric motor 3 which is started at its resting state at the time instant t1 and accelerated at a constant acceleration till the time instant t2. In FIG. 10, (b) shows a case where the load torque TL-is kept constant for simplicity. In this case, the actual value of the load power $P_{ow}$ bears an error with respect to the ideal value $P_{ow\_id}$, as shown in (c) of FIG. 10, owing to an estimated error such as the loss across the resister in the formula (1). The estimated current $I_q\hat{}$, as shown in (d) of FIG. 10, is infinite as the speed command ω1* is zero while the electric motor 3 is at rest. Moreover, while the speed command ω1* is small immediately after the start of the electric motor 3, the estimated current $I_q\hat{}$ takes a very large value irrespective of its ideal value $I_q\hat{}\_id$ so that it is possible that the electric motor 3 cannot be normally driven.

For this reason, the selector 511 in the current command generator 5 is actuated by the speed command ω1*. In detail, the selector 511 operates in such a manner that the initial value $I_q0*$ of the current command $I_q*$ is delivered while the electric motor 3 is at rest and while the absolute value of the speed command ω1* remains smaller than the threshold ω10* of the speed command ω1*, whereas the estimated current $I_q\hat{}$ is delivered at and after the time instant t3 when the absolute value exceeds the threshold ω10*. Accordingly, the obtained current command $I_q*$ changes as shown in (e) of FIG. 10, that is, the current command $I_q*$ can be prevented from becoming very large irrespective of the load condition while the absolute value of the speed command ω1* is small immediately after the start of the electric motor 3, so that the electric motor 3 can be started when it is at rest.

The threshold ω10* of the speed command ω1* depends on the accuracy in setting the ratings of the electric motor 3 used in the control device 1. For example, let it be assumed that the voltage drop across the resistor is 5% of the induced voltage and that the error in setting the resistance of the resistor is 10% of the induced voltage. Then, the speed command ω1* becomes 2% of the rated speed and the error in the estimated current $I_q\hat{}$ becomes 25% of the current command $I_q*$ at the rated load. Consequently, a fair operation can be obtained if the speed command threshold ω10* is set not less than 2% of the rated angular speed of the electric motor 3.

In this embodiment described above, the initial value $I_q0*$ of the current command $I_q*$ is set to zero. However, the initial value $I_q0*$ can be set at an arbitrary value which satisfies the following inequality (5) or it may be varied depending on the speed command ω1*.

$$(I_d0*)^2 + (I_q0*)^2 \leq (I_d*_{max})^2 \tag{5}$$

According to the operation of the control device 1 as described above, the current through the electric motor 3 can be changed depending on the load condition so that the electric motor 3 can be stably driven even if the load changes.

As described above, according to this embodiment, there can be provided an apparatus and a system for driving an AC motor wherein the electric motor 3 can be stably driven depending on the mechanical load thereon as the load power $P_{ow}$ is estimated by the load estimator 10 on the basis of the voltage commands $V_d*$ and $V_q*$ and the detected currents $I_{dc}$ and $I_{qc}$. Further, the electric motor 3 can be effectively driven even when it is running at a low speed.

Embodiment 2

Figure 11:
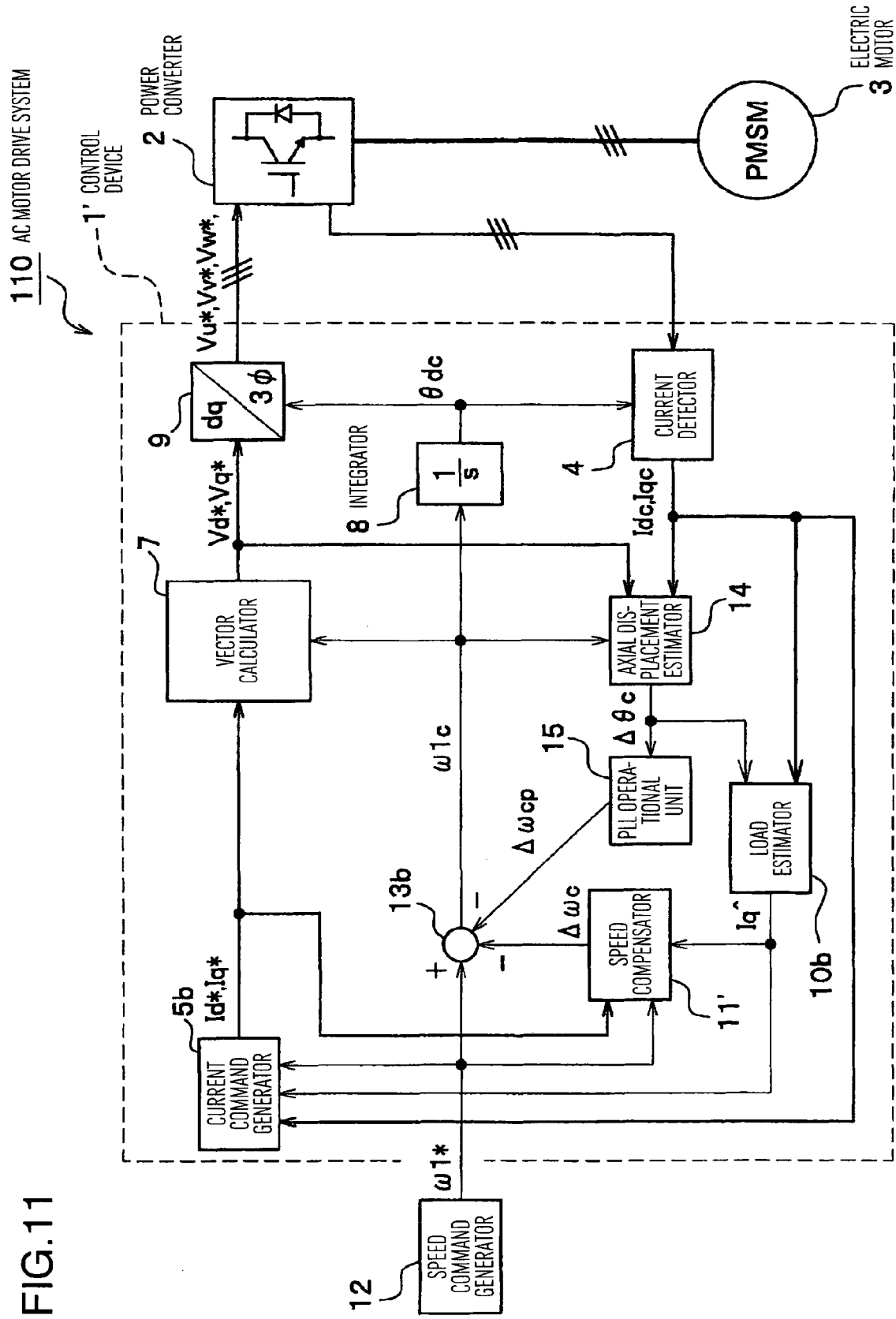
FIG. 11 schematically shows the overall constitution of an AC motor driving system as another embodiment of this invention.

Description will now be made of a second embodiment of this invention. FIG. 11 schematically shows the overall constitution of an AC motor driving system as the second embodiment of this invention. An axial displacement estimator 14 estimates the positions of the magnetic poles by obtaining the axial displacement Δθ defined in FIG. 2 and representing the displacement of the dc-axis with respect to the d-axis. Thus, by so manipulating the axial displacement Δθ as to make it minimum, the current as commanded flows along the effective axis and therefore the current component associated with the generation of torque does not decrease. A variety of methods for estimating the positions of the magnetic poles have been already known. In this second embodiment of the invention, the estimated axial displacement $\Delta\theta_c$ is calculated according to the following formula (6).

$$\Delta\theta_c = \tan^{-1}\left(\frac{Vd^* - R1 \times Idc + \omega 1c \times Iqc}{Vq^* - R1 \times Iqc - \omega 1c \times Lq \times Idc}\right) \tag{6}$$

Figure 12:
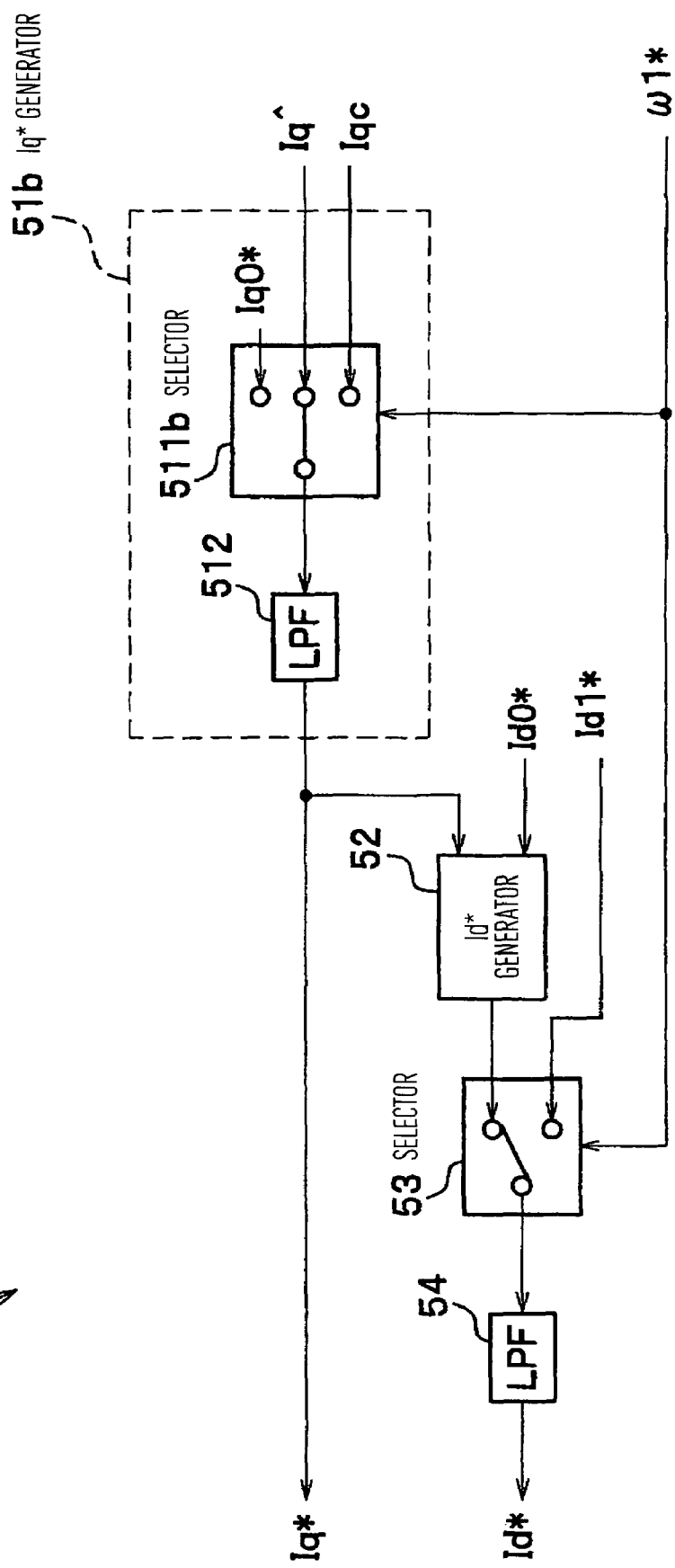
FIG. 12 schematically shows the constitution of the current command generator used in the control device of the system shown in FIG. 11.

A PLL operational unit 15 is a PI controller which implements position-sensor-free vector controls, the PLL operational unit 15 receiving the estimated axial displacement $\Delta\theta_c$ as an input and delivering the second compensatory speed command $\Delta_{\omega cp}$ as an output. FIG. 12 schematically shows the constitution of the current command generator 5 used in this embodiment. An $I_q*$ generator 51b includes a selector 511b for selecting one of the initial value $I_q0*$ of the current command $I_q*$, the estimated current command $I_q\hat{}$ and the detected current $I_{qc}$ along the qc-axis. A second selector 53 selects between the output of an $I_d*$ generator 52 and the current command value $I_{d1}*$ along the dc-axis during the position-sensor-free vector controls. A second low-pass filter (LPF) 54 serves to prevent the delivered current command $I_d*$ from changing stepwise in response to the input transience between the output of the $I_d*$ generator 52 and the current command value $I_{d1}*$. The load estimator 10b used in this embodiment may be a calculator which calculates the estimated current command $I_q\hat{}$ by using the following formula (7).

$$I_q\hat{} = I_{dc} \times \sin(\Delta\theta_c) + I_{qc} \times \cos(\Delta\theta_c) \tag{7}$$

Also, the adder 13b subtracts the compensatory speed command $\Delta_{\omega c}$ and the second compensatory speed command $\Delta_{\omega cp}$ delivered as output of the PLL controller 15, from the speed command ω1* so as to deliver an output as estimated electric angular speed ω1c. The other components of this embodiment are the same as those used in the first embodiment of this invention.

Figure 13:
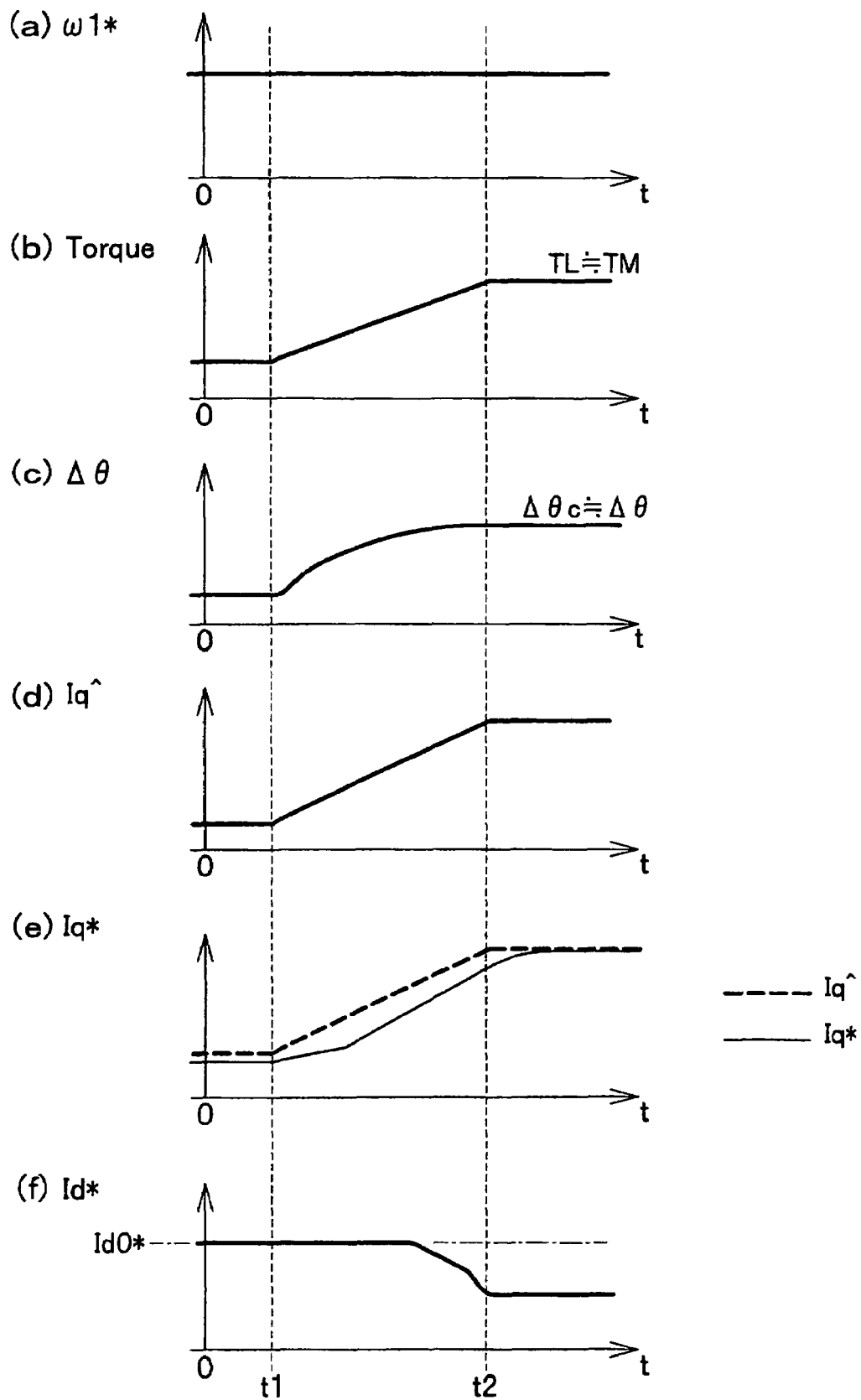
FIG. 13 shows several graphs used for explaining an operation of the control device of the system shown in FIG. 11.

Description will now be made of the control device 1 used in this embodiment. In FIG. 13, (a) through (f) graphically show the operations of the axial displacement calculator 14, the current command generator 5b and the load estimator 10 all as shown in FIG. 11, wherein the load torque TL on the electric motor 3 increases linearly with the speed command ω1* kept constant. In FIG. 13, (a) shows the constant speed command ω1*. As shown in (b) of FIG. 13, the load torque TL increases linearly from the time instant t1 through the time instant t2, the torque TM generated by the electric motor 3 being assumed to be nearly equal to the load torque TL. Under this condition, as the axial displacement Δθ corresponds to a load angle due to the load torque TL, the estimated axial displacement $\Delta\theta_c$ varies non-linearly as shown in (c) of FIG. 13, but the estimated current command $I_q\hat{}$ varies in proportion to the load torque TL according to the formula (7) as shown in (d) of FIG. 13. If the selector 511b delivers the estimated current command $I_q\hat{}$ continuously, the operation of the current command generator 5b is similar to that of the current command generator 5 as shown in FIG. 5.

In order to start the electric motor 3 when it is initially at rest, according to this embodiment, the selector 511b and the second selector 53 are to be changed over as indicated in the following table 1.

TABLE 1

| | Speed command ω1* | | |
|---|---|---|---|
| | abs(ω1*) < ω10* | ω10* ≦ abs(ω1*) < ω11* | ω11* ≦ abs(ω1*) |
| Output of selector 511b | $I_q0^*$ | $I_q$ | $I_{qc}$ |
| Output of 2$^{nd}$ selector 53 | Output of $I_d^*$ gnrtr. | Output of $I_d^*$ gnrtr. | $I_{d1}^*$ |

Figure 14:
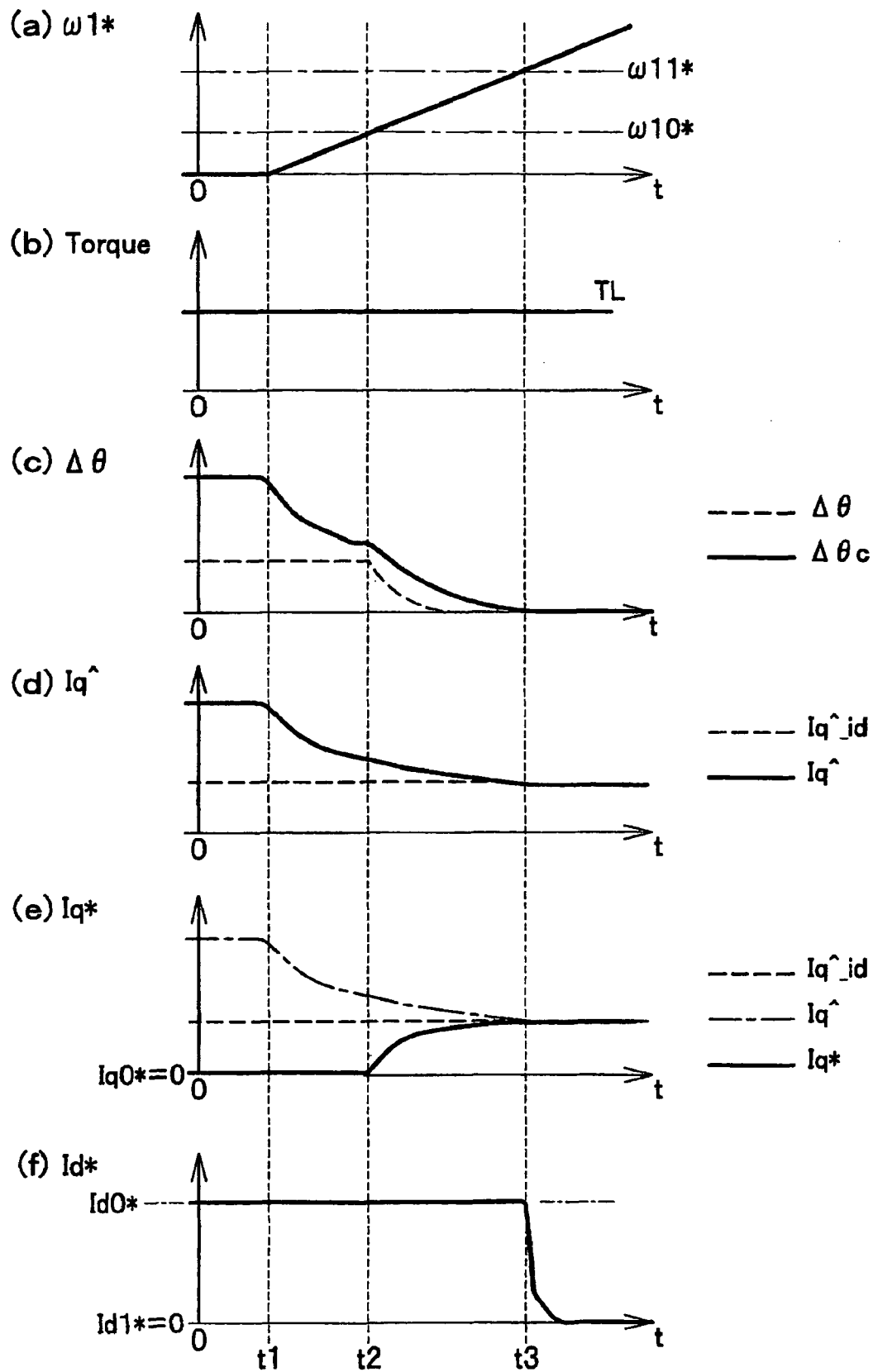
FIG. 14 shows several graphs used for explaining another operation of the control device of the system shown in FIG. 11.

The operations of the control device 1 for the conditions as listed in the table 1 will be described with reference to (a) through (f) of FIG. 14. In FIG. 14, (a) shows the speed command ω1*, which started at the time instant t1 when it is at rest and is accelerated at a constant acceleration. Here, it is assumed that the load torque TL remains constant while the generated torque TM is nearly equal to the load torque TL as shown in (b) of FIG. 14.

In FIG. 14, (c) shows the axial displacement Δθ and its estimated version Δθ$_c$. When the electric motor 3 is at rest, the axial displacement Δθ takes up a value corresponding to the load torque TL. If errors are involved in setting the respective ratings of the electric motor 3 used for the calculation according to the formula (6), Δθ$_c$ will have an error with respect to Δθ. The error will be greater as the effective electric angular speed ω1M decreases. As a result, the estimated torque current $I_q\hat{}$ shown in (c) of FIG. 14 will also have an error with respect to its ideal value $I_q\hat{}\_id$. Accordingly, a speed command threshold ω10* is introduced and thus the current command $I_q^*$ is prevented from taking up a value deviated largely from the ideal value $I_q\hat{}\_id$ by operating the selector 511b in such a manner that it delivers the initial value $I_q0^*$ while the absolute value of the speed command ω1* remains smaller than the threshold ω10* whereas it changes its output to the estimated torque current $I_q\hat{}$ when the absolute value exceeds the threshold ω10* at the time instant t2. After the time instant t3 when the speed command ω10*, which continues to increase, exceeds the second speed command threshold ω11*, the selector 511b delivers the detected current $I_{qc}$, the second selector 53 delivers the current command value $I_{d1}^*$, and the PLL controller 15 starts its operation so that the operation of the control device 1 is changed over to the position-sensor-free vector control. Consequently, the current commands $I_d^*$ and $I_q^*$ vary as shown in (e) and (f) of FIG. 14, respectively. According to this operation of the control device 1, the current command $I_q^*$ takes up a value corresponding to the load torque TL at the time instant t3 and since the axial displacement Δθ and its estimated version Δθ$_c$ are both nearly equal to zero, the switch-over of the control to the position-sensor-free vector control can be smoothly performed.

It should be understood that either the load estimator 10 shown in FIG. 3 or the combination of the axial error estimator 14 and the load estimator 10b can be used to estimate the load.

Figure 15:
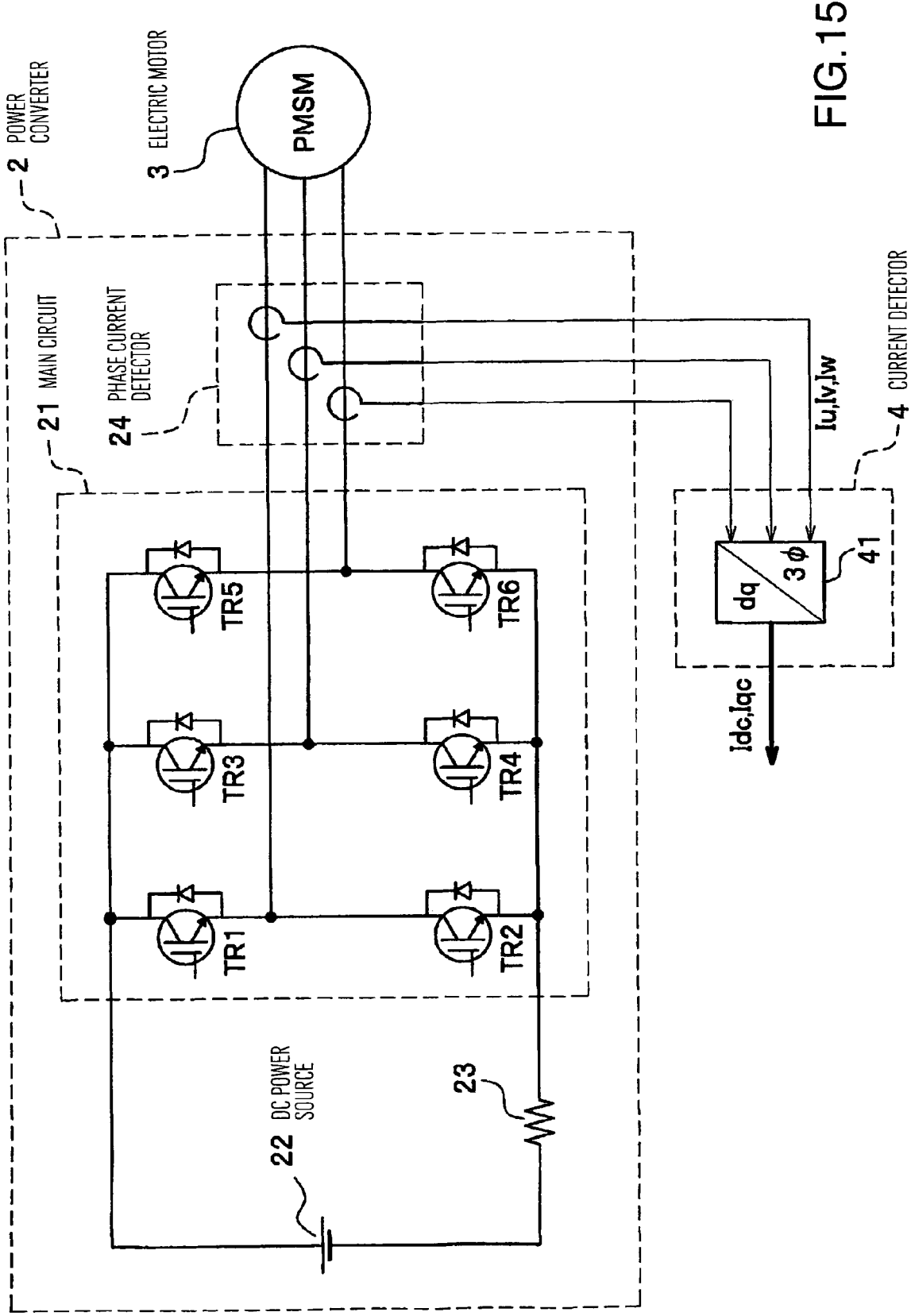
FIG. 15 is a circuit diagram used to explain how a current detection method according to this invention works.

Further, various methods are known to those skilled in the art, but one method for current detection applicable to this embodiment is shown in FIG. 15. A power converter 2 comprises a main circuit 21, a DC power source 22, a (non-inductive) resistor 23, and a phase current detector 24 for detecting the respective phase currents $I_U$, $I_V$ and $I_W$, which are supplied to a current detector 4. The current detector 4 is a d-q transformer which can derive the detected currents $I_{dc}$ and $I_{qc}$ along the dc- and qc-axes from the detected phase currents $I_U$, $I_V$ and $I_W$. The phase current detector 24 has only to detect at least two phase currents for the purpose.

Figure 16:
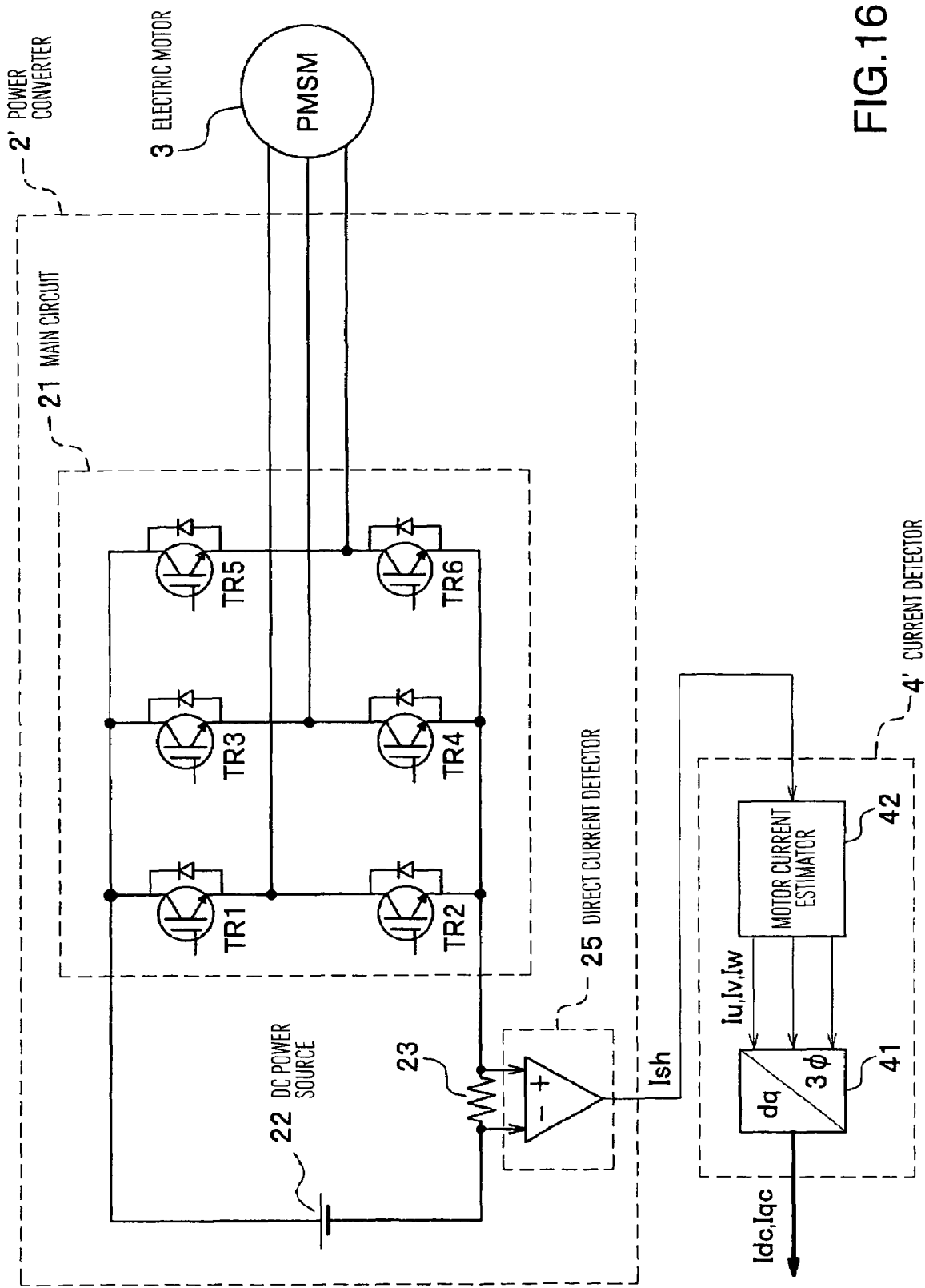
FIG. 16 is a circuit diagram used to explain how another current detection method according to this invention works.

FIG. 16 shows the constitution implementing another method for current detection. A power converter 2' includes the main circuit 21, the DC power source 22, the (non-inductive) resistor 23, these being the same as those shown in FIG. 15, and a direct current detector 25 for detecting the direct current $I_{sh}$ flowing from the DC power source 22 to the main circuit 21 on the basis of the voltage developed across the resistor 23. The direct current $I_{sh}$ is then supplied to a current detector 4' which consists of the d-q transformer 41 shown in FIG. 15 and a motor current estimator 42 for deriving the phase currents $I_U$, $I_V$ and $I_W$ from the direct current $I_{sh}$. The operation of the motor current estimator 42 does not feature this embodiment and it is well known to those skilled in the art, and therefore its description will be omitted.

Accordingly, this embodiment aims at estimating the load on the electric motor within the control device for controlling the electric motor and at controlling the electric motor in accordance with the load. The estimation of the load according to this embodiment is performed by calculating the power to be supplied to the electric motor on the basis of the voltage commands developed along the dc- and qc-axes and the detected currents and by estimating the torque current on the basis of the calculated power. Moreover, according to this embodiment, the current commands are determined as the current command values represented along the dc- and qc-axes on the basis of the estimated torque current, and the electric motor is driven on the basis of the voltage commands along the dc- and qc-axes derived from the current command values. Further, the oscillating component of the load on the electric motor is extracted on the basis of the estimated torque current and the current command values developed along the dc- and qc-axes, and the speed command processed within the control device is compensated depending on this oscillating component. Furthermore, the load may also be estimated by obtaining the axial error representing the axial displacement of the dc-axis with respect to the d-axis by using the detected currents and the voltage commands developed along the dc- and qc-axes and by estimating the torque current on the basis of the axial displacement.

As described above, according to the drive method implementing this embodiment, the torque current corresponding to the load on the electric motor is estimated on the basis of the detected currents and the voltage command values developed along the dc- and qc-axes within the control device, the current commands and the speed command are controlled depending on the estimated torque current, and therefore the electric motor can be stably driven depending on the load imposed thereon.

In addition, according to the drive method implementing this embodiment, the control wherein the load power $P_{ow}$ is estimated by using the load estimator 10, can be smoothly switched to the control wherein the axial error is used. Accordingly, the electric motor can be drive by using the axial displacement in the speed range within which the position-sensor-free vector control is applicable. Thus, a more preferable control can be achieved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An apparatus for controlling drive of an electric motor comprising:
   a current detecting means for detecting a current flowing through an externally connected electric motor;

a controlling means for generating a control signal to control the electric motor according to the current detected by a current detecting means and a speed command value for specifying the rotational speed of the electric motor; and a load estimating means for estimating a load condition from a load power corresponding to a mechanical load condition associated with the electric motor, said load power being calculated on the basis of both the current value detected by the current detecting means and the speed command value, wherein:
- the controlling means further comprises speed compensating means for compensating the speed command value based on the estimated load condition, and
- the controlling means controls the electric motor with the control signal generated on the basis of the detected current value and the compensated speed command value.

2. An apparatus for controlling the drive of an electric motor, as claimed in claim 1, wherein the electric motor is a poly-phase AC motor having a stator and a rotor to rotate with respect to the stator;

the current detecting means detects the current values decomposed into two components one of which is along the virtual magnetic flux axis advanced by an axial displacement $\Delta\theta$ in the direction of the rotation of the rotor with respect to the magnetic flux axis of the rotor and the other of which is along the virtual torque axis advanced by 90 degrees in the direction of the rotation with respect to the virtual magnetic flux axis; and the motor current component along the virtual torque axis is controlled.

3. An apparatus for controlling the drive of an electric motor, as claimed in claim 2, wherein the controlling means includes an axial displacement estimator for estimating the axial displacement between the magnetic flux axis of the rotor and the virtual magnetic flux axis used for control; and the motor current is controlled by the compensatory speed command value obtained by compensating the speed command value on the basis of the estimated axial displacement and the estimated load condition and the speed command value.

4. An apparatus for controlling the drive of an electric motor, as claimed in claim 1, wherein the speed command value is compensated by using the estimated load condition when the speed command value is smaller than a predetermined threshold; and the speed command value is compensated by using the estimated axial displacement when the speed command value is not smaller than the predetermined threshold.

5. An electric motor driving system comprising an electric motor;

a power converter for generating the motor current to flow through a electric motor;

a current detecting means for detecting the motor current;

a controlling means for generating the control signal to control the electric motor according to the current detected by a current detecting means, and a speed command value to command a rotational speed of the electric motor; and a load estimating means for estimating a load condition from a load power corresponding to a mechanical load condition imposed on the electric motor, said load power being calculated on the basis of the electric motor current and the speed command value, and wherein:
- the controlling means further comprises speed compensating means for compensating the speed command value based on the estimated load condition, and
- the controlling means controls the electric motor with the control signal generated on the basis of the detected current values and the compensated speed command value.

* * * * *